United States Patent
Vajravel et al.

(10) Patent No.: US 11,675,635 B2
(45) Date of Patent: Jun. 13, 2023

(54) SYSTEM AND METHOD FOR POWER MANAGEMENT FOR A UNIVERSAL SERIAL BUS TYPE C DEVICE USED BY VIRTUALIZED AND CONTAINERIZED APPLICATIONS

(71) Applicant: DELL PRODUCTS, LP, Round Rock, TX (US)

(72) Inventors: Gokul Thiruchengode Vajravel, Bangalore (IN); Vivek Viswanathan Iyer, Austin, TX (US); Ankit Kumar, Bengaluru (IN); Daniel L. Hamlin, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 316 days.

(21) Appl. No.: 17/070,432

(22) Filed: Oct. 14, 2020

(65) Prior Publication Data
US 2022/0114035 A1 Apr. 14, 2022

(51) Int. Cl.
*G06F 9/54* (2006.01)
*G06F 13/42* (2006.01)
*G06F 1/3228* (2019.01)

(52) U.S. Cl.
CPC ............ *G06F 9/542* (2013.01); *G06F 1/3228* (2013.01); *G06F 13/4282* (2013.01); *G06F 2213/0042* (2013.01)

(58) Field of Classification Search
None
See application file for complete search history.

(56) References Cited

U.S. PATENT DOCUMENTS

| | | | |
|---|---|---|---|
| 6,721,332 B1 * | 4/2004 | McAlear | H04L 12/46 370/466 |
| 10,324,752 B2 | 6/2019 | Khosrowpour et al. | |
| 2016/0034597 A1 | 2/2016 | Graf et al. | |
| 2017/0237675 A1 * | 8/2017 | Srinivasan | H04W 52/0261 370/413 |
| 2017/0286153 A1 * | 10/2017 | Bak | G06F 9/542 |
| 2019/0004579 A1 * | 1/2019 | Allen-Ware | G06F 1/3228 |

* cited by examiner

*Primary Examiner* — Craig C Dorais
(74) *Attorney, Agent, or Firm* — Larson Newman, LLP

(57) ABSTRACT

An information handling system includes a plurality of containerized applications, a container service, a hardware device, and a host processor to initialize a host service. The container service is associated with the containerized applications. The hardware device is virtualized to the containerized applications. The host processor identifies the hardware device that is virtualized to the containerized applications. The host processor receives a power notification from the container service. Based on the power notification, the host processor changes a power state of the hardware device.

18 Claims, 9 Drawing Sheets

SYSTEM AND METHOD FOR POWER MANAGEMENT FOR A UNIVERSAL SERIAL BUS TYPE C DEVICE USED BY VIRTUALIZED AND CONTAINERIZED APPLICATIONS

FIELD OF THE DISCLOSURE

The present disclosure generally relates to information handling systems, and more particularly relates to power management for a universal serial bus type C device used by virtualized and containerized applications in an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a plurality of containerized applications, a container service, a hardware device, and a host processor to initialize a host service. The container service may be associated with the containerized applications. The hardware device may be virtualized to the containerized applications. The host processor may identify the hardware device that is virtualized to the containerized applications. The host processor may receive a power notification from the container service. Based on the power notification, the host processor may change a power state of the hardware device.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
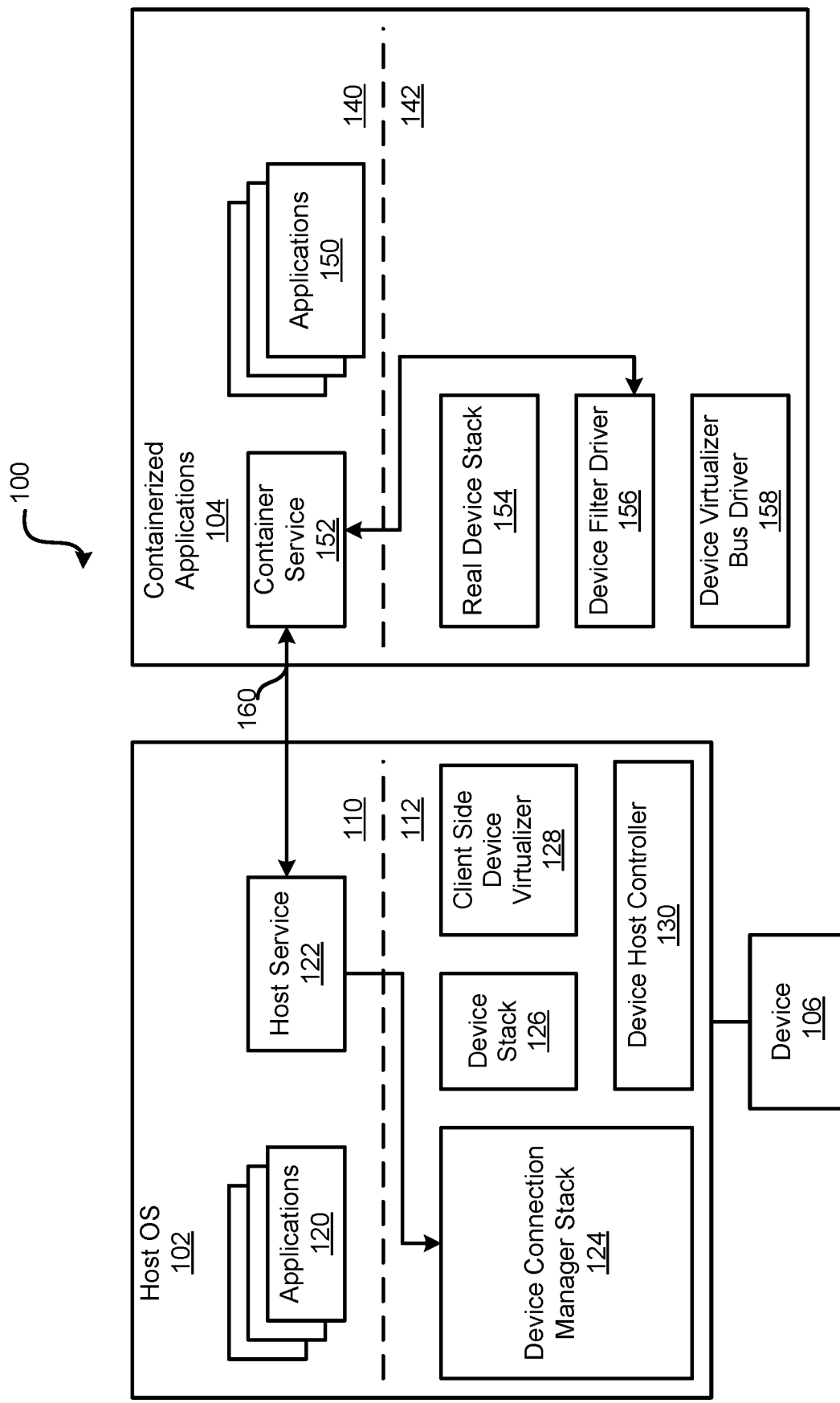
FIG. 1 is a block diagram of a portion of an information handling system according to at least one embodiment of the disclosure.

FIG. 1 shows a portion of an information handling system 100. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various other I/O devices, such as a keyboard, a mouse, and a video display. The information handling system may also include one or more busses operable to transmit communications between the various hardware components.

Information handling system 100 includes a host operating system (OS) 102, containerized applications 104, and a device 106. In an example, device 106 may be any suitable type of device including, but not limited to, a universal serial bus (USB) device, such as a USB type-C device. Host OS 102 includes a user portion 110 and a kernel portion 112. In an example, host OS 102 may be executed by a host processor, which in turn may perform one or more of the operations disclosed herein. In certain examples, the host processor may be any suitable processor including, but not limited to, central processing unit (CPU) 902 of FIG. 9. Within user portion 110, host OS 102 includes one or more applications 120 to be executed by the host processor, and a host service 122. Within kernel portion 112, host OS 102 includes a device connection manager stack 124, a device stack 126, a client side device virtualizer 128, and a device host controller 130. In an example, device connection manager stack 124 may be any suitable connection stack including, but not limited to, a USB connection manager (UCM) stack that is advanced configuration and power interface (ACPI)-Enumerated. Device stack 126 may be associated with local devices, such as local USB devices connected to a host processor. In an example, device host controller 130 may be any suitable host controller including, but not limited to, a USB extensible host controller interface (xHCI) host controller.

Figure 9:
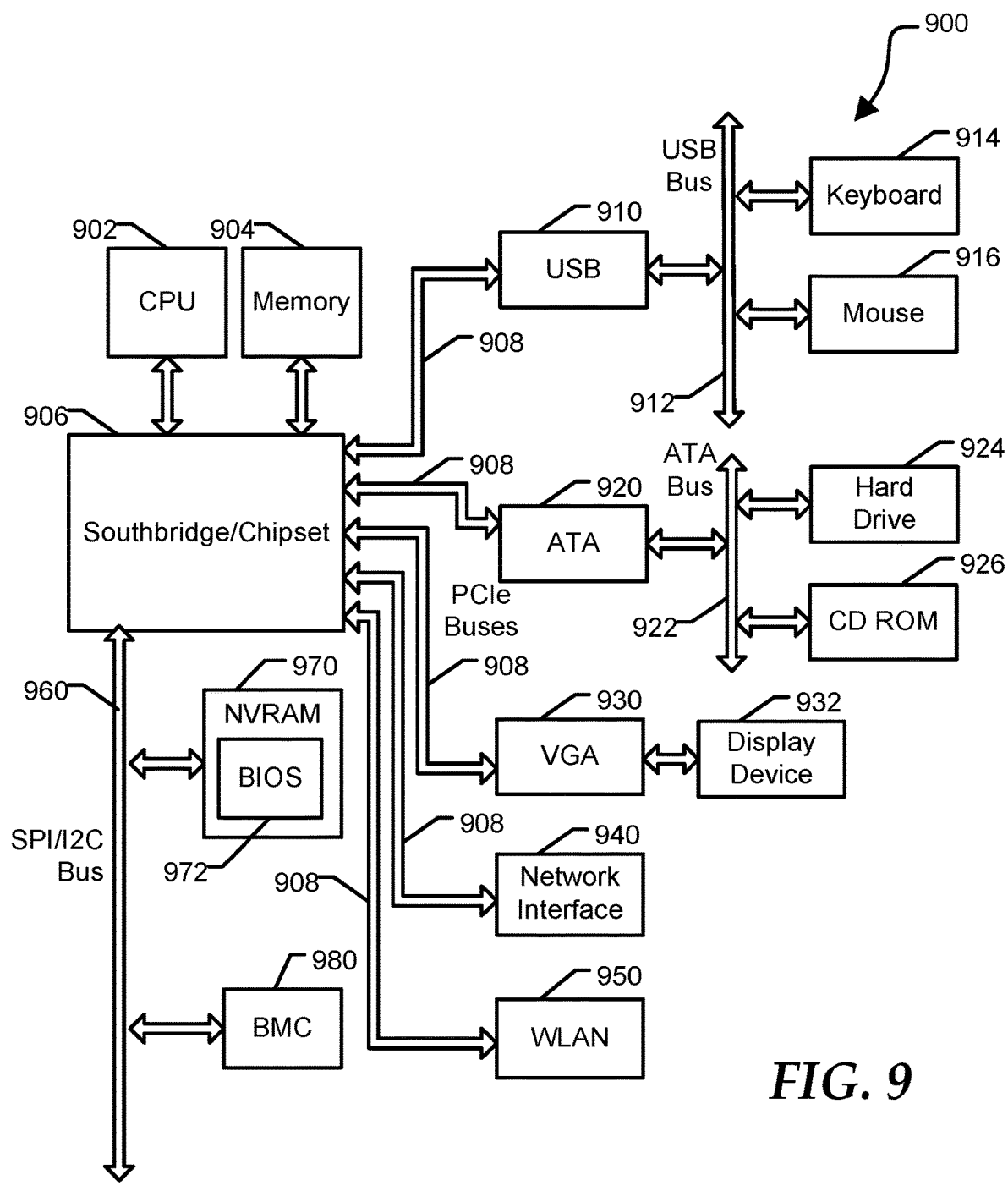
FIG. 9 is a block diagram of a general information handling system according to an embodiment of the present disclosure.

In an example, containerized applications 104 may be executed by a processor, such as CPU 902 of FIG. 9. Containerized applications 104 executed by a processor may include a user portion 140 and a kernel portion 142. Within user portion 140, containerized applications 104 include applications 150 and a container service 152. Within kernel portion 142, containerized applications 104 include a device stack 154, a device filter driver 156, and a device virtualizer bus driver 158. Device filter driver 156 may be any suitable filter driver including, but not limited to, a device Physical Device Object (PDO) filter driver. In an example, containerized applications 104 may be located within and executed by a virtualized system. In this embodiment, host service 122 may communicate with container service 152 via a communication channel 160 may be any suitable communication channel including, but not limited to, an internal network communication channel and an external network communication channel. In certain examples, information handling system 100 may include additional components over those shown in FIG. 1 without varying from the scope of this disclosure.

During operation, one or more processors within information handling system 100 may perform any suitable operations to virtualize device 106 and to perform power management controls for the device. In an example, client side device virtualizer 128 may communication with device virtualizer bus driver 158 to virtualize device 106 to containerized applications 104 of the virtual system of information handling system 100. Based on device 106 being virtualized, device stack 154 may perform functionality operations for device 106, such as controlling data flow between the device and other components of information handling system 100. Device connection manager stack 124 may control power management for device 106 and containerized applications 104.

In certain examples, applications 150 may be containerized in any suitable manner including, but not limited to, being containerized by software, and being containerized by hardware. In an example, different software implementations to containerize applications 150 may include, but is not limited to, docker and virtual desktop infrastructure (VDI). Different hardware implementations to containerize applications 150 may include, but is not limited to, hypervisor, such as Hyper-V docker, and VDI.

In an example, information handling system 100 may implement any suitable virtualization to perform virtualization of applications 150. For example, the virtualization implements may include, but are not limited to, VDI session and USB virtualization, enabling USB devices to be accessed by sandboxed or hardware isolated applications, and application in a hybrid client system. In an example, the VDI session with USB virtualization may include a locally connected USB device, such as device 106, to be virtualized at a connected remote session, such as Citrix, Vmware, RDP, and the like. This virtualization may enable applications running within the VDI session to seamlessly use locally connected USB device 106. In an example, device 106 may be any suitable USB device including, but not limited to, a webcam and a printers.

In an example, enabling device 106 to be accessed by Sandboxed or hardware isolated applications may allow one or more applications to be run in a separate Virtual-Machine for better security. In this example, an edge browser may allow a user to run untrusted websites in hardware isolated edge browser, such as WDAG for Edge. In a hybrid client, a desktop solution similar to Software-as-a-Service (SaaS) may deliver software. This hybrid client may provide a hybrid operating environment that enables an individual to seamlessly access virtual, cloud, or local applications and resources. In this example, the containerized applications may access locally attached USB device 106 via USB device virtualization.

In previous information handling systems, the separate controlling or management of the device functionality and power management between device stack 154 and device connection manager stack 124 may limit power management within an information handling system. For example, in previous information handling systems, the virtualization of device stack 154 may prevent the device stack from communicating with device connection manager stack 124. In this situation, previous information handling systems would not be able to efficiently optimize power consumption of device 106. In these previous information handling systems, an inability to communicate between device stack 154 and device connection manager stack 124 would result in the information handling system not be able to efficiently optimize power consumption of device 106. Information handling system 100 may be improved through communication of host service 122 and container service 152. These components may provide power states of device 106 from device filter driver 156 to device connection manager stack 124, which in turn may enable the device connection manager stack to efficiently optimize power consumption based on states of applications 150 as will be described herein.

In an example, the components of information handling system 100 may perform one or more suitable operations to provide power management of device 106 based on states of applications 150. For example, device filter driver 156 may attached itself or monitor device 106. In certain examples, device filter driver 156 may attach to virtual device 106 by monitoring power states set by a container OS. For example, device filter driver 156 may snoop IRP_MJ_POWER IRPs, and based on the snooping the device filter driver may detect the set power state. In previous information handling systems, only USB requests (URBs) for a virtualized device are sent to host-side USB driver. Thus, in these previous information handling systems, power state changes would not be sent to host OS 102. Information handling system 100 is improved by device filter driver 156 detecting a power state change for the virtualization of device 106. In response to this detection, device filter driver 156 may provide a state change notification to container service 152, which in turn may provide the state change notification to host service 122. Based on the relaying of the state change notification from container service 152 to host service 122, host OS 102 and device connection manager stack 124 become aware of state changes in applications 150 utilizing the virtualization of device 106.

In an example, while software containers are utilized by information handling system 100, container service 152 may perform one or more operations to provide state change notifications to host service 122. For example, container service 152 may monitor Universal Windows Platform (UWP) application states, and provide information to host service 122 based on changes in the UWP application states. In an example, the information may indicate that one or more of applications 150 have transitioned to a suspended state, and may indicate a device, such as device 106, used by the one or more applications. Additionally, the information may indicate that one or more of applications 150 have transitioned from a suspended state to a running or background state. While the monitoring of application states is described above with respect to UWP application states, one of ordinary skill in the art would recognize the applications 150 may also be non-windows applications, such as applications in a Linux system, without varying from the scope of this disclosure.

Based on the state change notification from container service 152, host service 122 and device connection manager stack 124 may perform any suitable number of operations to change the power profile of device 106. For example, in response to receiving a state change notification from container service 152, host service 122 communicate with device connection manager stack 124 to change the power state, or Physical Device Objects (PDOs), for the device, such as device 106, identified in the state change notification. In an example, in response to host service 124 being initialize by a host processor, the host service my identify USB-C devices, such as device 106, that are virtualized to containerized applications 104, may retrieve the power profiles supported by these devices, and may utilize the power profiles while setting a power state for the device based on the state change notification from container service 152. For example, if the state change notification indicates the virtualization of device 106 has gone to a low power state, host service 122 may set, via device connection manager stack 124, power state to the device to a lower-PDO. In an example, the lower-PDO may result in device 106 consuming less power. If the state change notification indicates the virtualization of device 106 has gone from a low to a high power state, host service 122 may set, via device connection manager stack 124, power state to the device to a higher-PDO. In response to device 106 being virtualized to containerized applications 104, host service 122 may perform the roles of OS policy manager (OPM) while working with container service 152 and device filter driver 156. Thus, the components of information handling system 100 including, but not limited to, host service 122, device connection manager stack 124, container service 152, and device filter driver 156, may improve the information handling system by optimizing power management for device 106 based on state changes of applications 150 within the containerized applications 104.

Figure 2:
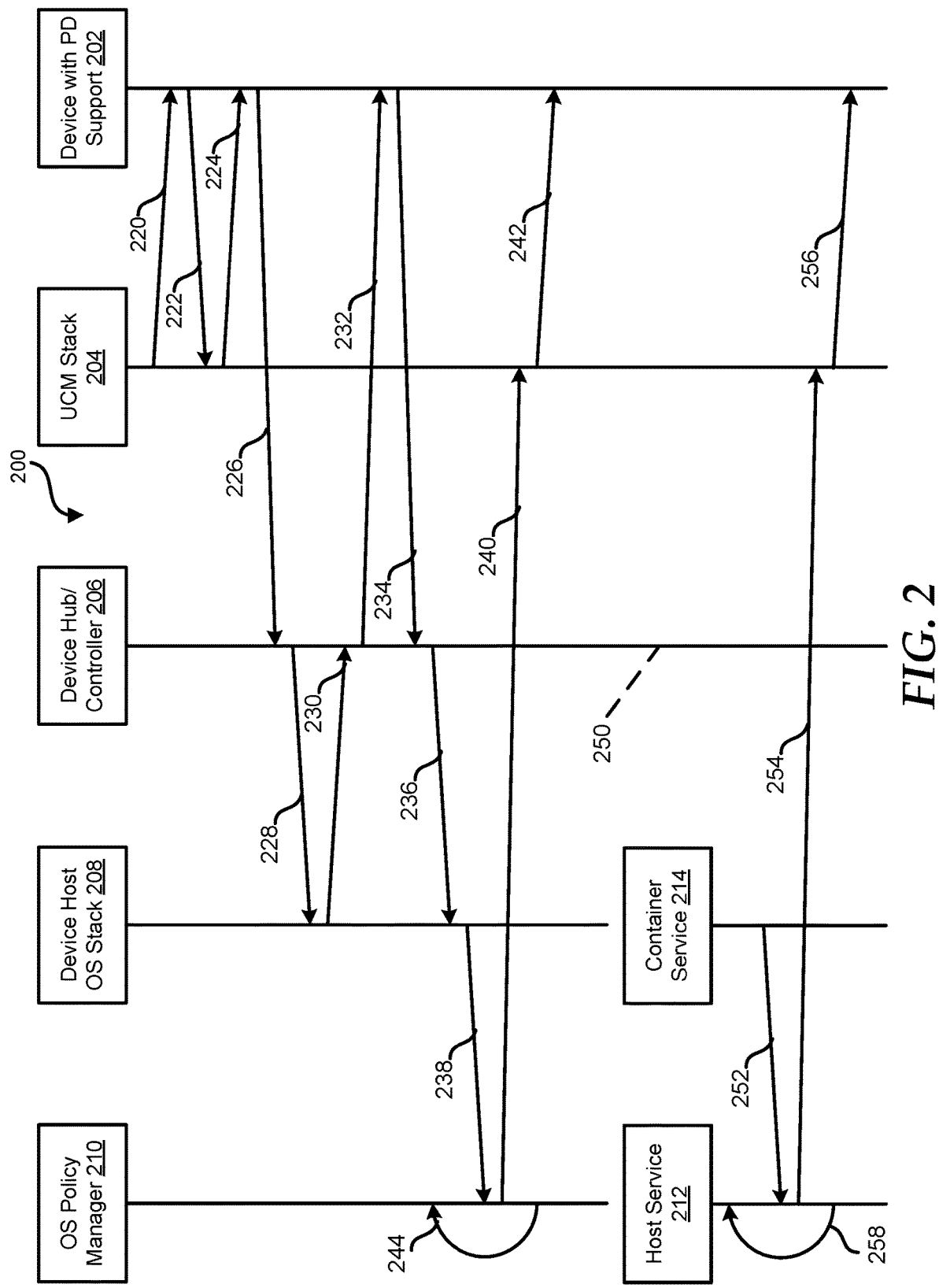
FIG. 2 is a flow graph of a method for setting power profiles for a device virtualized to containerized applications in an information handling system according to at least one embodiment of the present disclosure.

FIG. 2 is a flow graph of a method 200 for setting power profiles for a device virtualized to containerized applications in an information handling system according to at least one embodiment of the present disclosure. In an example, the information handling system includes a device 202, a UCM stack 204, a device hub 206, a device host OS stack 208, an OS policy manager 210, a host service 212, and a container service 214. In certain examples, the components described in FIG. 2 may be any suitable components including, but not limited to, the components described for information handling system 100 of FIG. 1.

At step 220, UCM stack 204 may initiate and negotiate communication and connection with device 202. At step 222, device 202 may communicate back with UCM stack 204 to complete the connection between the device and UCM stack. At step 224, the successful connection between device 202 and UCM stack 204 may result in the UCM stack set a default power device output (PDO) profile for the device. At step 226, device 202 may connect with device hub/connector 206. At step 228, device controller 206 may enumerate device host OS stack 208 to connect device 202 with the device host OS stack. At block 230, device host OS stack 208 may send data to device controller 206, which in turn may send the data to device 202 at step 232.

At step 234, device 202 may send data back to device controller 206, which in turn may provide the data to device host OS stack 208 at step 236. At block 238, device host OS stack 208 may communicate with OS policy manager 210 to set a mode for device 202. In an example, the mode may be any suitable settings for device 202 including, but not limited to, communication speeds, alternate settings, and change notifications. At step 240, the power profile for device 202 may be provided from OS policy manager 210 to UCM stack 204. At step 242, the power profile is provided to device 202 via a UCSI commend, such as a SET PDO command. The update of power profile for device 202 may be repeated until device 202 is disconnected as represented by step 244.

At step 250, device 202 may be virtualized to containerized applications. In response to virtualization of device 202, device host OS stack 208 may no longer be available setting a power profile of device 202. Based on device host OS stack 208 not being available, host service 212 and container service 214 may be utilized to optimize power management for device 202 while the device is virtualized. At step 252, container service 214 may provide a state change notification to host service 212. In response to the state change notification, host service 212 may provide an updated power profile for device 202 to UCM stack 204 at step 254. At step 256, UCM stack 204 may provide the power profile to device 202 via a UCSI commend, such as a SET PDO command. The update of power profile for device 202 may be repeated until device 202 is no longer virtualized as represented by step 244.

Figure 3:
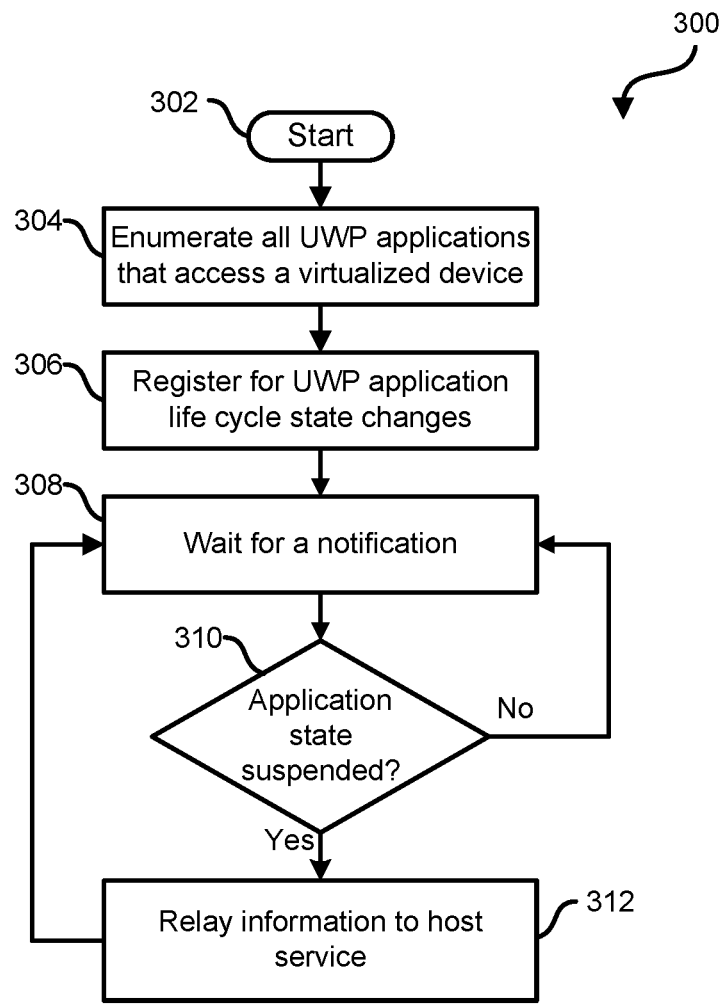
FIG. 3 is a flow diagram of a method for providing application state changes to a host processor according to at least one embodiment of the present disclosure.

FIG. 3 is a flow diagram of a method for providing application state changes to a host processor according to at least one embodiment of the present disclosure, starting at block 302. It will be readily appreciated that not every method step set forth in this flow diagram is always necessary, and that certain steps of the methods may be combined, performed simultaneously, in a different order, or perhaps omitted, without varying from the scope of the disclosure. FIG. 3 may be employed in whole, or in part, by information handling system 100 depicted in FIG. 1 or any other type of system, controller, device, module, processor, or any combination thereof, operable to employ all, or portions of, the method of FIG. 3.

At block 304, all applications are enumerated. In an example, the enumerated applications may be those applications that access a virtualized device. In certain examples, the enumeration may be performed by a container service of an information handling system. At block 306, application life cycle state changes are registered for by the container service. In an example, the life cycle state changes may be any suitable changes including, but not limited to, the application being placed in a suspended state, and the application returning to a background or running state.

At block 308, a state change notification is waited for by the container service. In response to the state change notification, a determination whether the application is in a suspended state is made at block 310. If the application is not in a suspended state, the flow continues as described above at block 308. If the application is in a suspended state, the information in the state change notification is relayed to a host service at block 312, and the flow continues as stated above at block 308. In an example, the information may include any suitable information about the state change including, but not limited to, a device virtualized to the application and the current state of the application.

Figure 4:
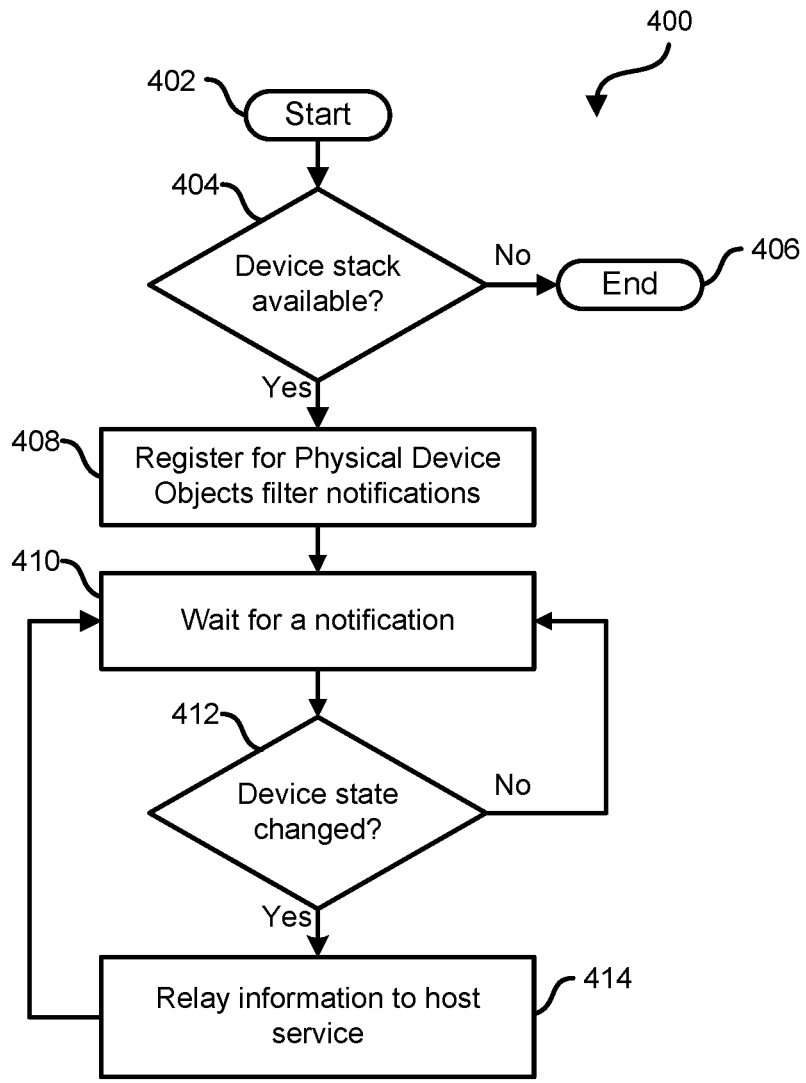
FIG. 4 is a flow diagram of a method for providing state changes of a virtualized device to a host processor according to at least one embodiment of the present disclosure.

FIG. 4 is a flow diagram of a method for providing state changes of a virtualized device to a host processor according to at least one embodiment of the present disclosure, starting at block 402. It will be readily appreciated that not every method step set forth in this flow diagram is always necessary, and that certain steps of the methods may be combined, performed simultaneously, in a different order, or perhaps omitted, without varying from the scope of the disclosure. FIG. 4 may be employed in whole, or in part, by information handling system 100 depicted in FIG. 1 or any other type of system, controller, device, module, processor, or any combination thereof, operable to employ all, or portions of, the method of FIG. 4.

At block 404, a determination is made whether a device stack is available. In an example, the device stack may be associated with any suitable device including, but not limited to, a virtualized device, and a non-virtualized device. If the device stack is not available, the method ends at block 406. If the device stack is available, Physical Device Objects (PDO) filter notifications are registered for by a container service at block 408.

At block 410, a PDO filter notification is waited for by the container service. In response to the PDO filter notification, a determination whether a state of the device has changed is made at block 412. If the state of the device has not changed, the flow continues as described above at block 410. If the state of the device has changed, the information in the Physical Device Object filter notification is relayed to a host service at block 414, and the flow continues as stated above at block 410. In an example, the information may include any suitable information about the state change including, but not limited to, an identity of a virtualized device and the current state of the virtualized device.

Figure 5:
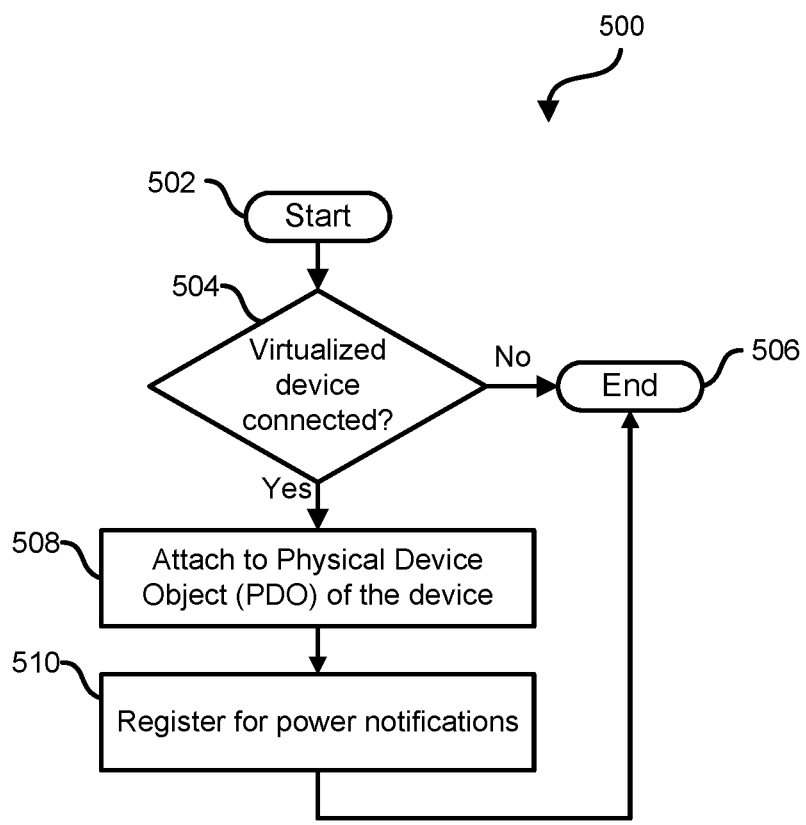
FIG. 5 is a flow diagram of a method for registering power notifications in an information handling system according to at least one embodiment of the present disclosure.

FIG. 5 is a flow diagram of a method for registering power notifications in an information handling system according to at least one embodiment of the present disclosure, starting at block 502. It will be readily appreciated that not every method step set forth in this flow diagram is always necessary, and that certain steps of the methods may be combined, performed simultaneously, in a different order, or perhaps omitted, without varying from the scope of the disclosure. FIG. 5 may be employed in whole, or in part, by information handling system 100 depicted in FIG. 1 or any other type of system, controller, device, module, processor, or any combination thereof, operable to employ all, or portions of, the method of FIG. 5.

At block 504, a determination is made whether a virtualized device is connected to containerized applications. If a virtualized device is not connected, the method ends at block 506. If a virtualized device is connected, a PDO of the virtualized device is attached to by a PDO filter driver at block 508. At block 510, power notifications are registered for by the PDO filter driver, and the method ends at block 506.

Figure 6:
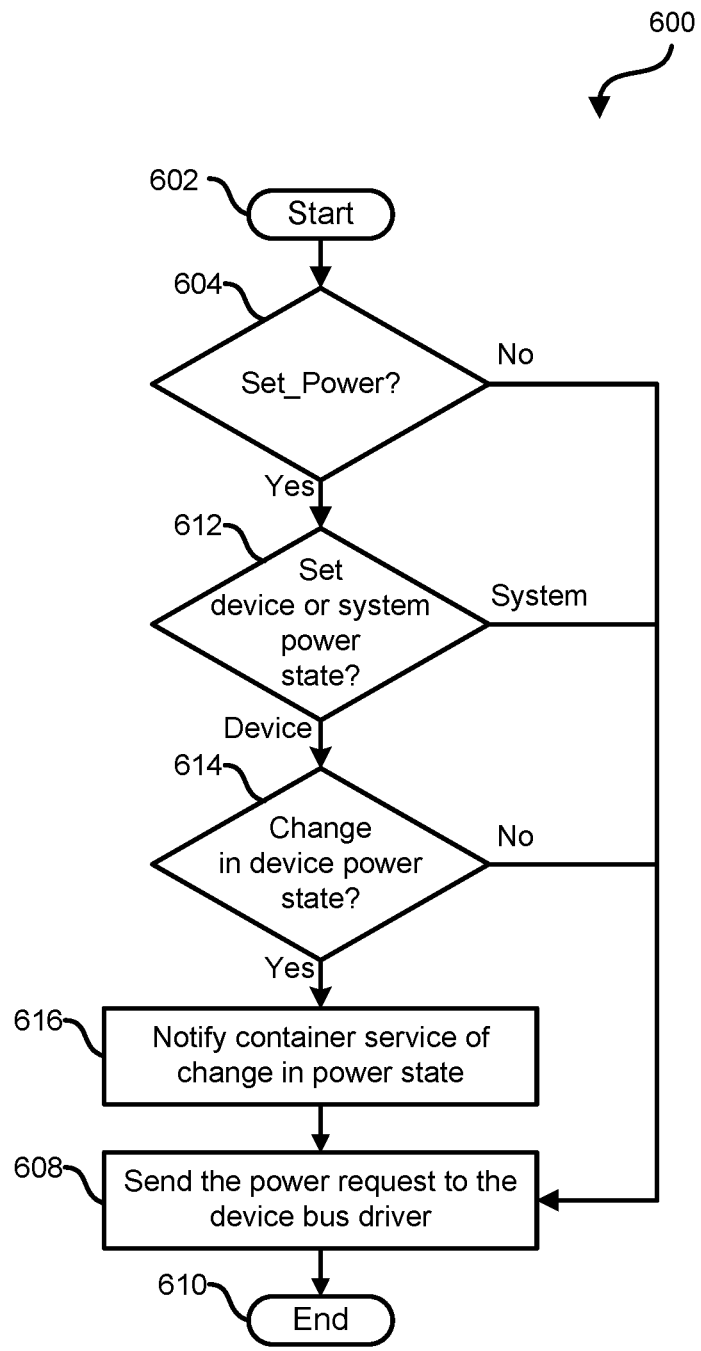
FIG. 6 is a flow diagram of a method for providing power requests in an information handling system according to at least one embodiment of the present disclosure.

FIG. 6 is a flow diagram of a method for providing power requests in an information handling system according to at least one embodiment of the present disclosure, starting at block 602. It will be readily appreciated that not every method step set forth in this flow diagram is always necessary, and that certain steps of the methods may be combined, performed simultaneously, in a different order, or perhaps omitted, without varying from the scope of the disclosure. FIG. 6 may be employed in whole, or in part, by information handling system 100 depicted in FIG. 1 or any other type of system, controller, device, module, processor, or any combination thereof, operable to employ all, or portions of, the method of FIG. 6.

At block 602, an entry of IRP_MJ_POWER handler is detected. At block 604, a determination is made whether a set power communication has been provided. If the set power communication is not provided, a power requests is sent to a device bus driver at block 608 and the method ends at block 610. If the set power communication is provided, a determination is made whether the set power communication is for a device power state or a system power state at block 612. If the set power communication is for a system power state, the flow continues as described above at block 608.

If the set power communication is for a device power state, a determination is made a change is made in a device power state at block 614. If the device power state is not changed, the flow continues as described above at block 608. If the device power state is changed, a container service is notified of power state change at block 616, and the flow continues as described above at block 608. In an example, the power state change notification may include any suitable information including, but not limited to, current power information for the device.

Figure 7:
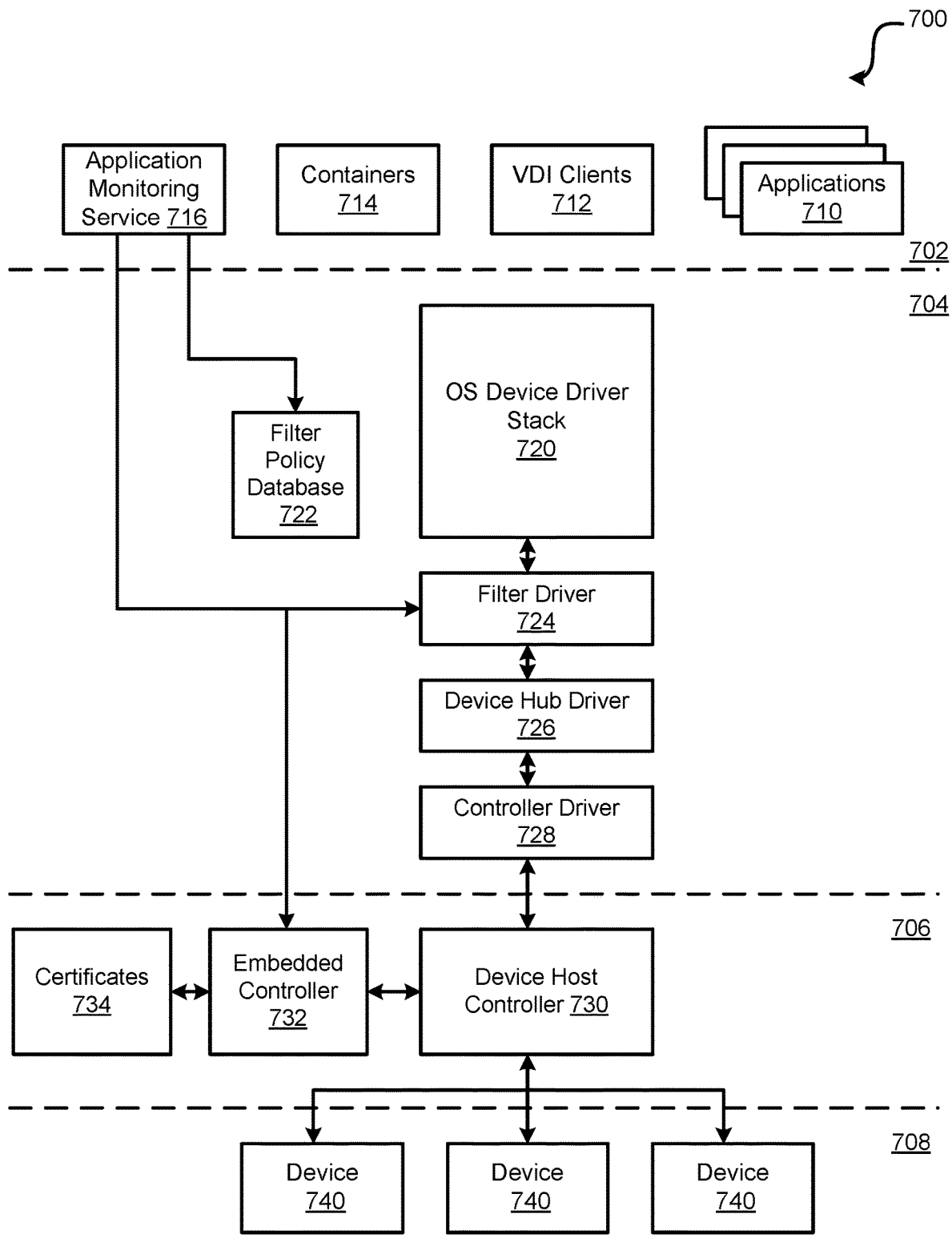
FIG. 7 is a block diagram of a portion of an information handling system according to at least one embodiment of the disclosure.

FIG. 7 shows of a portion of an information handling system 700 according to at least one embodiment of the disclosure. In an example, a processor of information handling system 700 may perform one or more of the operations disclosed herein. In certain examples, the processor may be any suitable processor including, but not limited to, central processing unit (CPU) 902 of FIG. 9. The processor of information handling system 700 may include a user portion 702, a kernel portion 704, and a UEFI or embedded controller portion 706. In an example, the UEFI or kernel portion 706 may communicate with hardware 708. User portion 702 includes applications 710, VDI clients 712, containers 714, and an application monitoring service 716. In an example, the components within user portion may be those with direct interface with a user of information handling system 700.

Kernel portion 704 includes an OS device driver stack 720, a filter policy database 722, a filter driver 724, a device hub driver 726, and a controller driver 728. In an example, filter driver 724 may be any suitable type of driver including, but not limited to, a bus PDO filter uDriver. Controller driver 728 may be any suitable driver including, but not limited to, an xHCI controller driver. UEFI or embedded controller 706 includes a device host controller 730, an embedded controller 732, and certificates 734. In an example certificates 734 may include authentication certificates for devices connected to information handling system 700. Hardware 708 may include and suitable devices 740. In an example, devices 740 may be any suitable type of device including, but not limited to, a universal serial bus (USB) device, such as a USB type-C drive, camera, printer, or the like. In an example, device stack 720 may be associated with local devices, such as local USB devices connected to a host processor. In certain examples, information handling system 700 may include additional components over those shown in FIG. 7 without varying from the scope of this disclosure.

During operation, components of information handling system 700 may perform one or more operations to authenticate devices 740 connected to the information handling system. For example, in response to a device 740 being connected to device host controller 730, embedded controller 732 may access certificates 734 and determine whether the connected device has a valid certificate. Based on embedded controller 732 retrieving a valid certificate, the embedded controller may authenticate device 740 across all portions of information handling system 700 including, but not limited to, OS, UEFI, Pre-Boot, and imaging. However, in previous information handling systems, embedded controller 732 could not authenticate, such as enable or disable, device 740 based on an OS role, user role, system role, application role, or virtualized context. Thus, information handling system 700 is improved by extending device authentication to environments or components based on virtualization of device 740 and a state of application 710, VDI client, or container 714 interfacing with the device. These operations improve information handling system 700 may increasing security of the information handling system by limiting applications with access to device 740.

In an example, in response to an initial authentication of device 740, the device may communicate with OS device driver stack 720 over a communication bus and connected through controller driver 728, device hub driver 726, and filter driver 724. In certain examples, filter driver 724 may snoop the communication bus between OS device driver stack 720 and any enumerated devices 740. In a default mode, filter driver 724 may only enable a keyboard, mouse, or legacy device to be accessed by applications 710, VDI clients 712, and containers 714. If device 740 is not a keyboard, mouse, or legacy device, filter driver 724 may block the device by changing hardware identifiers for the device. In an example, filter driver 724 may block device 740 even if the device has been authenticated by embedded controller 732. In response to device 740 being blocked, the device is not exposed or viewable by the OS and applications 710.

In certain examples, application monitoring service 716, may perform one or more suitable operations to determine whether device 740 may be accessible by one or more applications. For example, application monitoring service 716 may communicate with VDI client 712 to identify a VDI session state. In an example, the VDI session state may be any suitable state including, but not limited to, an active state, a connected state, a disconnected state, and a suspended state. In response to application monitoring service 716 detecting an active state of VDI client 712, the application monitoring service may provide a notification to filter driver 724. In an example, the notification may including any suitable information for the active VDI client including, but not limited to, a policy for the VDI client and device 740 to be accessed by the VDI client. In certain examples, the policy may be stored in filter policy database 722.

In response to the notification, filter driver 724 may communicate with embedded controller 732 to retrieve a certificate 734 for the identified device 740. In an example, filter driver 724 may retrieve certificate 734 via a host controller API without interfacing with the embedded controller 732. Filter driver 724 may determine whether certificate 734 is valid, and may determine what type of class is allowed based on the policy of VDI client 712. Based on certificate 734 being valid and device 732 being allowed, filter driver 724 may issue a soft reset of device 740. In an example, the soft reset of device 740 may re-enumerate the device and allow the device to be visible by applications of VDI client 712. In an example, a user or administrator of information handling system 700 may set a policy in filter policy database 722 to allow disk class devices 740 to Citrix sessions when the devices have a Kingston certificate.

If based on a state change, application monitoring service 716 determines that applications 710 of VDI client 712 is no longer active, application monitoring service 716 may notify filter driver 724 to disable device 740. In response to the disable notification, filter driver 724 may perform a reset of device 740 and change the identifiers of the device to prevent the device from being accessible by applications 710. In certain examples, application monitoring service 716 may perform substantially similar operations as those described above for containers 714, such as VAIL containers, sandbox containers, or other container scenarios.

In an example, application monitoring service 716 and filter driver 724 may perform one or more suitable operations to enable or disable device 740 based on an application 710 level authorization. For example, in a default mode, filter driver 724 may only enable a keyboard, mouse, or legacy device to be accessed by applications 710 unless an application is looking for the device. If device 740 is not a keyboard, mouse, or legacy device, and an application 710 is not looking for the device, filter driver 724 may block the device by changing hardware identifiers for the device.

In response to a launch of an application 710, application monitoring service 716 may get one or policies for the application from filter policy database 722. In an example, the policy may include any suitable information for application 710 including, but not limited to, an allowed class of device for the application, an approved vendor certificate 734, and a serial number for device 740. Application monitoring service 716 may provide a notification with the policy information to filter driver 724 along with a PID for application 710.

In response to filter driver 724 receiving the notification, the filter driver may reset device 740 when the device is already connected and not-exposed to the OS. Filter driver 724 may also filter I/Os between application 710 and device 740 based on the PID of the application. If application 710 is closed or suspended, application monitoring service 716 may notify filter driver 724 that the PID of the application is no longer valid. In response to the notification, filter driver 724 may complete all pending I/O requests and then block device 740 in any suitable manner. For example, filter driver 724 may block device 740 by issuing a reset of the device and change identifiers of the device to prevent the application from being visible by an application.

In an example, application monitoring service 716 and filter driver 724 may perform substantially similar operations to enable and disable a device 740 based on a user of information handling system 700. For example, device 740 may be enabled for a particular user and then the device may be disabled when the user logs off of information handling system 700.

Figure 8:
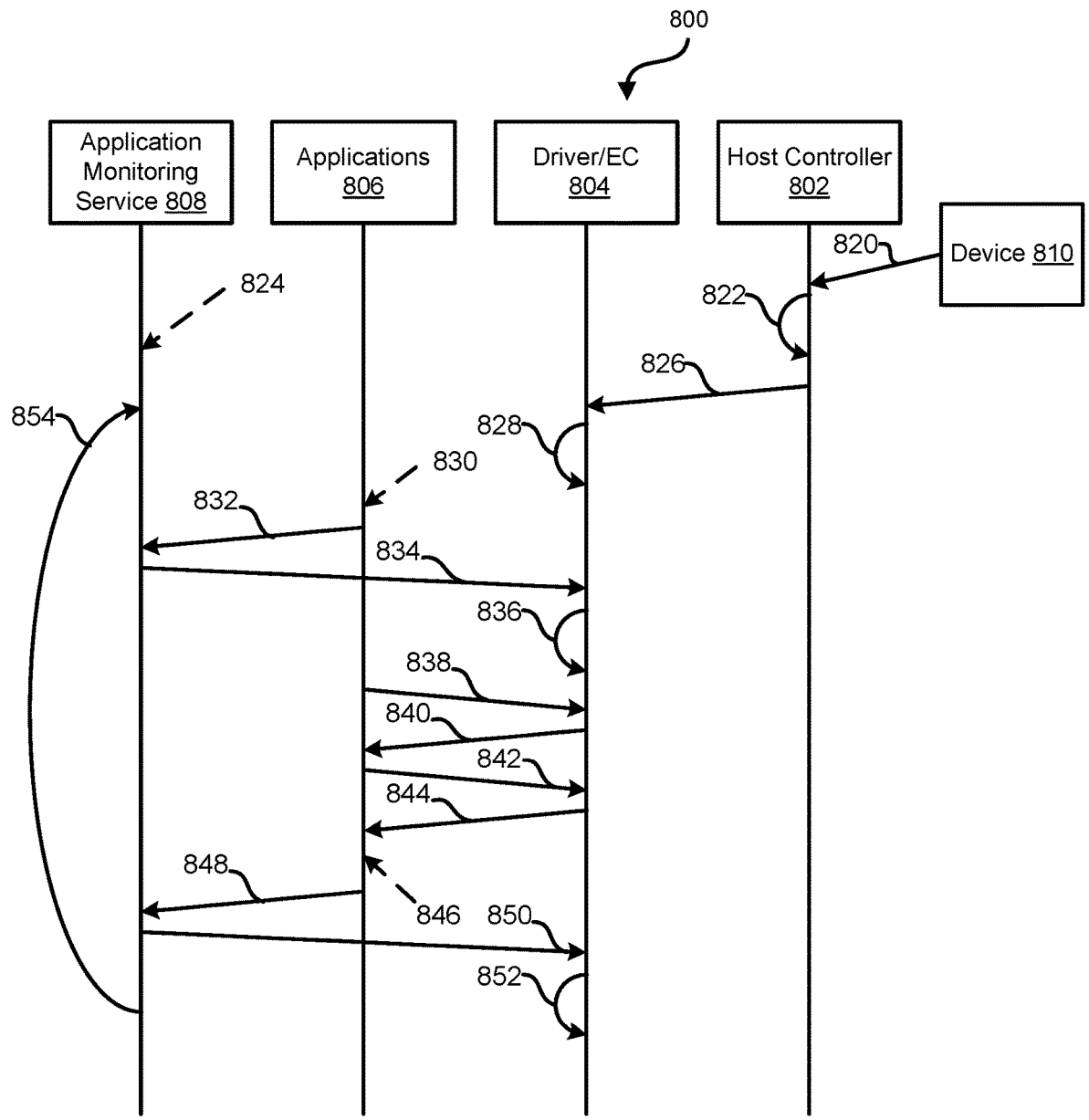
FIG. 8 is a flow graph of a method for enabling and disabling a device connected to an information handling system according to at least one embodiment of the present disclosure.

FIG. 8 shows a flow graph of a method 800 for enabling and disabling a device connected to an information handling system according to at least one embodiment of the present disclosure. The information handling system includes a host controller 802, a driver or embedded controller 804, applications 806, an application monitoring system 808, and a device 810. In certain examples, the components described in FIG. 8 may be any suitable components including, but not limited to, the components described for information handling system 700 of FIG. 7.

At step 820, device 810 is connection to the information handling system. In an example, device 810 may be any suitable type of device including, but not limited to, a USB-C device. At step 822, authorization of device 810 is successful. At step 824, registration for application state change notifications is performed. At step 826, a device connection notification is provided from host controller 802 to driver 804. At step 828, driver 804 determines that no applications are searching for connected device 810.

At step 830, a virtualized application is launched. In an example, application 806 may be any suitable virtualized or containerized application including, but not limited to, a VDI application, a sandbox application, and a business application. At step 832, an application launched notification is provided to application monitoring service 808. In an example, the application launched notification may indicate that the application has been launched by an OS. In response to the application launched notification, application monitoring service 808 may retrieve information about application 806. In an example, the application information may include any suitable information including, but not limited to, a name of application 806, a path for the application, a product identifier (PID) for the application, a policy for the application with respect to device 810, and information about the device. At step 834, information about application 806 is provided to driver 804 based on application 806 having device 810 as an authorized USB device.

At step 836, device 810 is reset and driver 804 may enable the device to be visible to the OS and applications. In an example, driver 804 may additionally provide filters that limited input/output (I/Os) between application 806 and device 810 by PID. In this example, the I/O filters may limit or avoid other applications from accessing device 810. At steps 838, 840, 842, and 844, I/Os between application 806 and device 810 are performed. At step 846, application 806 is closed.

At block 848, an application closed notification is provided to application monitoring service 808. In an example, the application closed notification may indicate that the application has been closed by an OS. At block 850, an application closed notification is provided to driver 804. In an example, the application closed notification may request that device 810 used by application 806 be blocked. At block 852, device 810 is reset, blocked from the OS, and blocked from applications 806. In an example, device 810 is block by changing device identifiers for the device. At step 854, the flow continues in response to another application 806 being launched.

FIG. 9 illustrates a general information handling system 900 including a processor 902, a memory 904, a southbridge/chipset 906, one or more PCIe buses 908, a universal serial bus (USB) controller 910, a USB 912, a keyboard device controller 914, a mouse device controller 916, a configuration an ATA bus controller 920, an ATA bus 922, a hard drive device controller 924, a compact disk read only memory (CD ROM) device controller 926, a video graphics array (VGA) device controller 930, a network interface controller (NIC) 940, a wireless local area network (WLAN) controller 950, a serial peripheral interface (SPI) bus 960, a NVRAM 970 for storing BIOS 972, and a baseboard management controller (BMC) 980. In an example, chipset 906 may be directly connected to an individual end point via a PCIe root port within the chipset and a point-to-point topology as shown in FIG. 9. BMC 980 can be referred to as a service processor or embedded controller (EC). Capabilities and functions provided by BMC 980 can vary considerably based on the type of information handling system. For example, the term baseboard management system is often used to describe an embedded processor included at a server, while an embedded controller is more likely to be found in a consumer-level device. As disclosed herein, BMC 980 represents a processing device different from CPU 902, which provides various management functions for information handling system 900. For example, an embedded controller may be responsible for power management, cooling management, and the like. An embedded controller included at a data storage system can be referred to as a storage enclosure processor.

System 900 can include additional processors that are configured to provide localized or specific control functions, such as a battery management controller. Bus 960 can include one or more busses, including a SPI bus, an I2C bus, a system management bus (SMBUS), a power management bus (PMBUS), and the like. BMC 980 can be configured to provide out-of-band access to devices at information handling system 900. As used herein, out-of-band access herein refers to operations performed prior to execution of BIOS 972 by processor 902 to initialize operation of system 900.

BIOS 972 can be referred to as a firmware image, and the term BIOS is herein used interchangeably with the term firmware image, or simply firmware. BIOS 972 includes instructions executable by CPU 902 to initialize and test the hardware components of system 900, and to load a boot loader or an operating system (OS) from a mass storage device. BIOS 972 additionally provides an abstraction layer for the hardware, such as a consistent way for application programs and operating systems to interact with the keyboard, display, and other input/output devices. When power is first applied to information handling system 900, the system begins a sequence of initialization procedures. During the initialization sequence, also referred to as a boot sequence, components of system 900 are configured and enabled for operation, and device drivers can be installed. Device drivers provide an interface through which other components of the system 900 can communicate with a corresponding device.

Information handling system 900 can include additional components and additional busses, not shown for clarity. For example, system 900 can include multiple processor cores, audio devices, and the like. While a particular arrangement of bus technologies and interconnections is illustrated for the purpose of example, one of skill will appreciate that the techniques disclosed herein are applicable to other system architectures. System 900 can include multiple CPUs and redundant bus controllers. One or more components can be integrated together. For example, portions of southbridge/chipset 906 can be integrated within CPU 902. Additional components of information handling system 900 can include one or more storage devices that can store machine-executable code, one or more communications ports for communicating with external devices, and various input and output (I/O) devices, such as a keyboard, a mouse, and a video display. An example of information handling system 900 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

In an example, information handling system 900 may be any suitable device including, but not limited to, information handling system 100 of FIG. 1 and information handling system 700 of FIG. 7. Information handling system 900 can include a set of instructions that can be executed to cause the information handling system to perform any one or more of the methods or computer based functions disclosed herein. The information handling system 900 may operate as a standalone device or may be connected to other computer systems or peripheral devices, such as by a network.

In a networked deployment, the information handling system 900 may operate in the capacity of a server or as a client user computer in a server-client user network environment, or as a peer computer system in a peer-to-peer (or distributed) network environment. The information handling system 900 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 900 can be implemented using electronic devices that provide voice, video or data communication. Further, while a single information handling system 900 is illustrated, the term "system" shall also be taken to include any collection of systems or sub-systems that individually or jointly execute a set, or multiple sets, of instructions to perform one or more computer functions.

The information handling system 900 can include a disk drive unit and may include a computer-readable medium, not shown in FIG. 9, in which one or more sets of instructions, such as software, can be embedded. Further, the instructions may embody one or more of the methods or logic as described herein. In a particular embodiment, the instructions may reside completely, or at least partially, within system memory 904 or another memory included at system 900, and/or within the processor 902 during execution by the information handling system 900. The system memory 904 and the processor 902 also may include computer-readable media.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
    initializing, by a host processor of an information handling system, a host service;
    initializing a container service for containerized applications within the information handling system;
    identifying, by the host processor, a device of the information handling system that is virtualized to the containerized applications;
    receiving, by the host processor, a power notification from the container service;
    based on the power notification, changing, by the host processor, a power state of the device;
    analyzing a communication bus for the containerized applications;
    detecting, by the container service, a power state set for the virtualized device, wherein the power state is set by an operating system of the containerized applications; and providing, by the container service, the power state set to the host processor.

2. The method of claim 1, further comprising:
in response to identifying the device, receiving, by the host processor, a power profile supported by the device.

3. The method of claim 1, wherein the changing of the power state of the device includes:
communicating, by the host processor, with a universal serial bus connection manager stack to change the power state of the device.

4. The method of claim 1, wherein the host processor operates as an operating system policy manager via communication with the container service and a Physical Device Object filter driver.

5. The method of claim 1, further comprising:
relaying, by the container service, the power notification from a Physical Device Object filter driver of the containerized applications.

6. The method of claim 1, further comprising:
monitoring, by the container service, application states to provide usage of the device.

7. The method of claim 1, wherein virtualized device is a virtualized universal serial bus device.

8. An information handling system comprising:
a plurality of containerized applications;
a container service associated with the containerized applications;
a hardware device virtualized to the containerized applications; and
a host processor to initialize a host service, the host processor to communicate with the containerized applications, and to communicate with the container service via the host service, the host processor to:
identify the hardware device that is virtualized to the containerized applications;
receive a power notification from the container service;
based on the power notification, change a power state of the hardware device;
analyze a communication bus for the containerized applications;
detect a power state set for the virtualized hardware device, wherein the power state is set by an operating system of the containerized applications; and
provide the power state set to the host processor.

9. The information handling system of claim 8, wherein in response to identifying the device, the host processor further to:
receive a power profile supported by the device.

10. The information handling system of claim 8, wherein the changing of the power state of the hardware device includes, the processor further to:
communicate with a universal serial bus connection manager stack to change the power state of the hardware device.

11. The information handling system of claim 8, wherein the host processor operates as an operating system policy manager via communication with the container service and a Physical Device Object filter driver.

12. The information handling system of claim 8, wherein the container service to:
relay the power notification from a Physical Device Object filter driver of the containerized applications.

13. The information handling system of claim 8, wherein the container service to:
monitor application states to provide usage of the device.

14. The information handling system of claim 8, wherein hardware virtualized device is a virtualized universal serial bus device.

15. A method comprising:
monitoring, by a processor of an information handling system, a communication bus;
receiving, by the processor via the communication bus, a connection notification from a device attached to the information handling system;
determining, by the processor, whether an application that is currently being executed within the information handling system requests the device;
in response to the application not requesting the device, blocking, by the processor, the device; and
in response to the application requesting the device, allowing, by the processor, the device to be seen by an operating system of the information handling system and the application, wherein the device is allowed based on an information associated with the application and information associated with the device.

16. The method of claim 15, further comprising:
in response to the application closing, receiving, at the processor, a notification to block the device; and
based on the notification, changing identifiers of the device to block the device from the operating system and other applications.

17. The method of claim 15, wherein the processor executes a driver to block and allow the device based on whether the application is requesting the device.

18. The method of claim 15, wherein the processor is an embedded controller.

* * * * *